US008751866B2

(12) United States Patent
Gooding et al.

(10) Patent No.: US 8,751,866 B2
(45) Date of Patent: Jun. 10, 2014

(54) AUTONOMIC FAULT ISOLATION IN A HIGHLY INTERCONNECTED SYSTEM

(75) Inventors: Thomas Michael Gooding, Rochester, MN (US); Brian Paul Wallenfelt, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 2365 days.

(21) Appl. No.: 11/536,360

(22) Filed: Sep. 28, 2006

(65) Prior Publication Data

US 2008/0155324 A1  Jun. 26, 2008

(51) Int. Cl.
*G06F 11/32* (2006.01)

(52) U.S. Cl.
USPC .............................. 714/25; 714/43; 709/223

(58) Field of Classification Search
USPC .................................................. 714/25, 43, 4
See application file for complete search history.

(56) References Cited

U.S. PATENT DOCUMENTS

| | | | | |
|---|---|---|---|---|
| 6,993,403 B1 * | 1/2006 | Dadebo et al. | ................ | 700/108 |
| 2002/0166088 A1 * | 11/2002 | Dierauer et al. | ............. | 714/704 |
| 2003/0188228 A1 * | 10/2003 | Davis et al. | ..................... | 714/43 |
| 2003/0191841 A1 * | 10/2003 | DeFerranti et al. | ........... | 709/226 |
| 2003/0204786 A1 * | 10/2003 | Dinker et al. | ................... | 714/43 |
| 2004/0013112 A1 * | 1/2004 | Goldberg et al. | ............. | 370/389 |
| 2004/0103218 A1 * | 5/2004 | Blumrich et al. | ............. | 709/249 |
| 2005/0015685 A1 * | 1/2005 | Yamamoto | ....................... | 714/54 |
| 2005/0091361 A1 * | 4/2005 | Bernstein et al. | ............. | 709/223 |
| 2005/0276214 A1 * | 12/2005 | Phelan et al. | .................. | 370/216 |
| 2005/0278354 A1 * | 12/2005 | Gupta et al. | ................... | 707/100 |
| 2006/0029096 A1 * | 2/2006 | Babbar et al. | ................. | 370/466 |
| 2006/0112061 A1 * | 5/2006 | Masurkar | ........................ | 706/47 |
| 2008/0114874 A1 * | 5/2008 | Meir et al. | ..................... | 709/224 |

* cited by examiner

*Primary Examiner* — Chae Ko
(74) *Attorney, Agent, or Firm* — Martin & Associates LLC; Bret J. Petersen (57) ABSTRACT

A method and apparatus provides fault isolation in a in a highly interconnected system. A fault isolator uses a virtual topology of the system to autonomically isolate the fault. Failing nodes interconnects are identified and then used to traverse a virtual topology to determine the most suspect components as the cause of the reported failures. A failure indication is propagated to each component connected to a failing node in the virtual topology until the next node in the virtual topology is encountered. In preferred embodiments, the failure indications for each component are tallied together as the topology is traversed for each failing node and/or component. A total count of the number of nodes connected to each component is determined for a denominator. A weighting of the likelihood of fault is then determined by dividing the failure indications by the total count.

19 Claims, 6 Drawing Sheets

AUTONOMIC FAULT ISOLATION IN A HIGHLY INTERCONNECTED SYSTEM

BACKGROUND OF THE INVENTION

1. Technical Field

This invention generally relates to fault isolation in a computing system, and more specifically relates to autonomic fault isolation in a highly interconnected system such as a massively parallel super computer.

2. Background Art

Fault isolation is important to decrease down time and repair costs for sophisticated computer systems. In some sophisticated computer systems, when a failure occurs, the operating system software is able to generate a list of suspect field replaceable units (FRUs) that are potentially the location or cause of the failure. A technician can then quickly change out the suspect FRUs to get the system quickly operational again. A highly interconnected system as used herein is a sophisticated computer system that has a large number of interconnecting nodes such as compute nodes. Fault isolation in a highly interconnected system is much more complicated because a failure in one node may cause the system to report a failure in many adjacent interconnected nodes. The raw data for the failure is difficult for a technician to determine which FRU is most likely the cause of the failure.

Massively parallel computer systems are one type of highly interconnected system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/P system is a similar scalable system under development. The Blue Gene/L node consists of a single ASIC (application specific integrated circuit) with 2 CPUs and memory. The full computer would be housed in 64 racks or cabinets with 32 node boards in each rack.

The Blue Gene/L supercomputer communicates over several communication networks. The 65,536 computational nodes are arranged into both a logical tree network and a logical 3-dimensional torus network. The logical tree network connects the computational nodes in a binary tree structure so that each node communicates with a parent and two children. The torus network logically connects the compute nodes in a three-dimensional lattice like structure that allows each compute node to communicate with its closest 6 neighbors in a section of the computer. Since the compute nodes are arranged in a torus and tree network that require communication with adjacent nodes, a hardware failure of a single node in the prior art can bring a large portion of the system to a standstill until the faulty hardware can be repaired. This catastrophic failure occurs because a single node failure would break the network structures and prevent communication over these networks. For example, a single node failure would isolate a complete section of the torus network, where a section of the torus network in the Blue Gene/L system is a half a rack or 512 nodes.

On a massively parallel super computer system like Blue Gene, the time to troubleshoot a failure of a hardware component is critical. Thus it is advantageous to be able to quickly isolate a fault to an FRU to decrease the overall system down time. Without a way to more effectively isolate faults to FRUs highly interconnected computers will need to require manual effort to isolate faults thereby wasting potential computer processing time and increasing maintenance costs.

DISCLOSURE OF INVENTION

According to the preferred embodiments, a method and apparatus is described for autonomic fault isolation in a highly interconnected computer system such as a massively parallel super computer system. In the preferred embodiments failing nodes are identified and then used to traverse a virtual system topology to determine the most suspect components as the cause of the reported failures. In preferred embodiments, a weighting of the most suspect nodes is determined and displayed to the user.

The disclosed embodiments are directed to the Blue Gene architecture but can be implemented on any parallel computer system with multiple processors arranged in a network structure. The preferred embodiments are particularly advantageous for massively parallel computer systems.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to an apparatus and method for autonomic fault isolation in a highly interconnected computer system such as a massively parallel super computer system. In the preferred embodiments failing nodes are identified and then used to traverse a virtual system topology to determine the most suspect components as the cause of the reported failures. The preferred embodiments will be described with respect to the Blue Gene/L and Blue Gene/P massively parallel computer being developed by International Business Machines Corporation (IBM).

Figure 1:
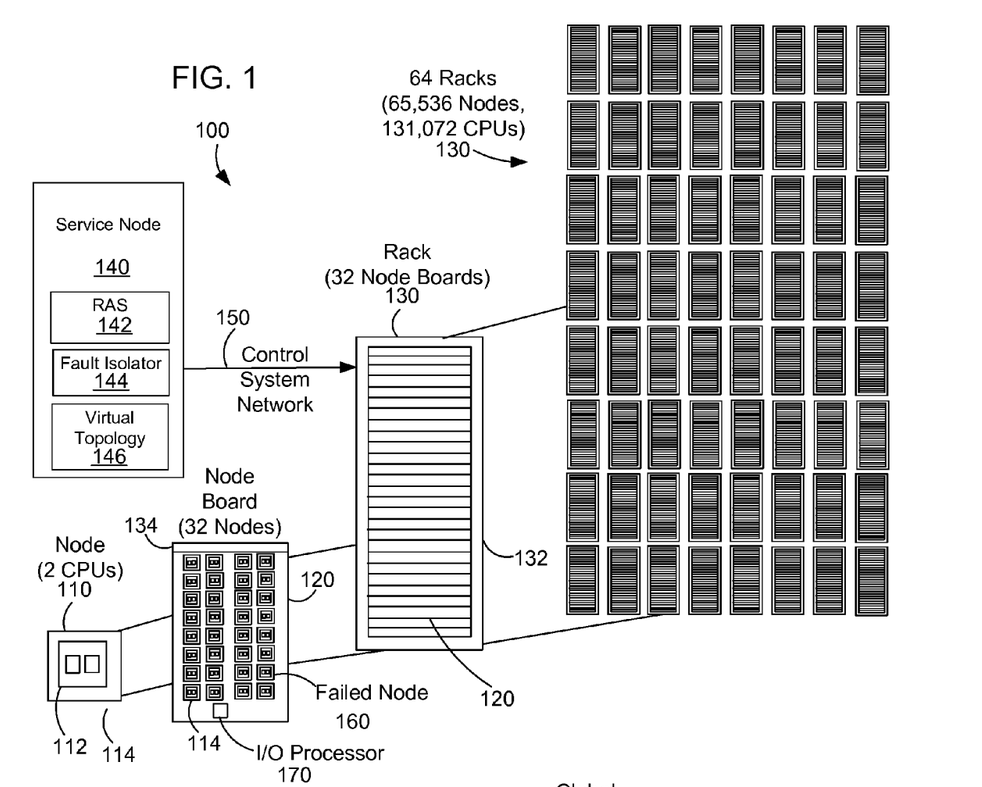
FIG. 1 is a block diagram of a massively parallel computer system according to preferred embodiments.

FIG. 1 shows a block diagram that represents a massively parallel computer system 100 such as the Blue Gene/L computer system. The Blue Gene/L system is a scalable system in which the maximum number of compute nodes is 65,536. Each node 110 consists of a single application specific integrated circuit (ASIC) 112 with 2 CPUs and memory on a node daughter card 114. Each node 110 typically has 512 megabytes of local memory. A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

Again referring to FIG. 1, the computer system 100 includes a service node 140 that handles the loading of the nodes with software and controls the operation of the whole system. The service node 140 is typically a mini computer system that includes a control console (not shown). The service node 140 is connected to the racks 130 of compute nodes 110 with a control system network 150. The control system network 150 includes various network interfaces that provide the necessary communication for the massively parallel computer system. An I/O processor 170 located on a node board 120 handles communication from the service node 140 to a number of nodes. In the Blue Gene/L system, an I/O processor 170 is installed on a node board 120 to communicate with 1024 nodes in a rack.

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the tree network and also have functional wide area network capabilities through a gigabit ethernet network. The connections to the I/O nodes is similar to the connections to the compute node except the I/O nodes are not connected to the torus network.

According to claimed embodiments herein, when a number of nodes report failure in a highly interconnected system, a fault isolator 144 in the service node 140 uses a virtual topology 146 of the system to autonomically isolate the fault. The virtual topology is a logical representation of the system topology stored in a computer readable form. The failing nodes are identified and the virtual topology is then traversed to determine the most suspect components as the cause of the reported failures. The virtual topology can be stored in any suitable manner to allow the fault isolator 144 to traverse and use the virtual topology as described herein. A failure indication is propagated to each component in the virtual topology 146 that are connected through a suspect I/O connection of all identified failing nodes. Each component in the virtual topology has it's own failure indication count that is incremented each time that component is traversed.

Before the links of identified nodes in the virtual topology are traversed, the suspect I/O connections of each of the identified nodes are determined based on the nature of the failure and those interconnects that may be the cause of the failure. All nodes that need not be searched are filtered out and only the unfiltered links are traversed to propagate failure indications to all components down that link in the topology. Because of the highly linked structure, the failure indication is propagated until the next node in the virtual topology 146 is encountered to prevent duplicating traversal through the topology. This is necessary because the weighting is based on the number of times each component's fail count is incremented, so each link in the topology is only traversed one time for each failed node. When another node is encountered, traversing that link in the topology is complete.

In preferred embodiments, the failure indications for each component are tallied together as the topology is traversed for each failing node and/or component. A total count of the number of failure reporting components connected to each component is determined for a denominator. A weighting of the likelihood of fault is then determined by dividing the failure indications by the total count. Thus a weighting of 1.0 means that all failure reporting components connected to the component are indicating a failure, and therefore there is a high probability that component is causing the fault. Other weighting methods can also be used to predict the failing components. For example, the weighting could be failing nodes/total nodes/hopcount, where hopcount is the number of components that were traversed before encountering the next node. The greater the virtual tree distance away or the greater the hopcount may indicate a lesser likelihood to be the cause of the fail. Or the weighting could be 1/hopcount. In addition, the weighting could also incorporate field data of actual failures in correlation to the weighting methods described herein to produce a likelihood of failure.

The failed nodes that are used as input to the fault isolator can be identified by the system in a first option, or designated by the user in the second option. In the BlueGene system, the designated nodes in a first option are identified by the system with a system service called Reliability, Availability and Service (RAS). The RAS identifies nodes and other components that are reporting a failure and the type of failure. The user designated failures could be from another source such as from an application program.

Figure 2:
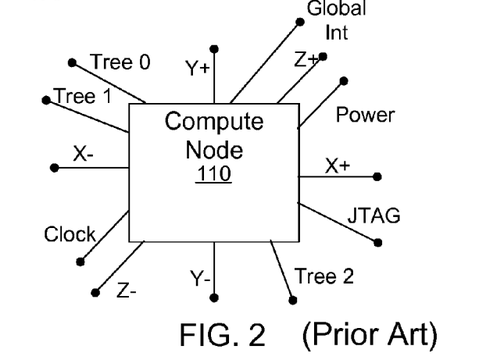
FIG. 2 is a block diagram of a compute node for in a massively parallel computer system according to the prior art.

FIG. 2 shows a block diagram that shows the I/O connections of a compute node to illustrate the highly connected nature of a computer system such as the massively parallel Blue Gene/L computer system. The Blue Gene/L supercomputer communicates over several communication networks. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node the six respective adjacent nodes. The tree network is represented in FIG. 2 by the tree0, tree1 and tree2 connections.

Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figure 3:
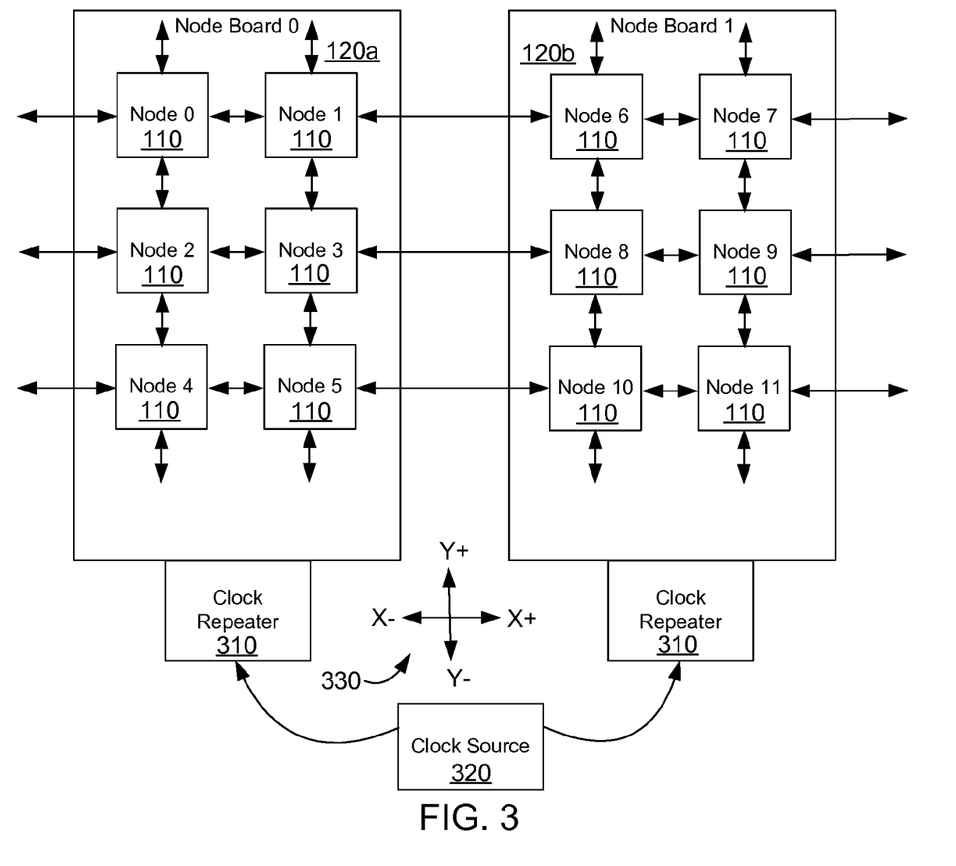
FIG. 3 is a block diagram representing a portion of a highly interconnected computer system such as a massively parallel computer system to illustrate an example according to preferred embodiments.

FIG. 3 shows a block diagram that represents a portion of a highly connected computer system such as the Blue Gene/L computer system to illustrate an example according to preferred embodiments. In this example, each node board 120a, 120b has six nodes. Node board 120a has nodes labeled node0 through node5, and node board 120b has nodes labeled node6 through node11. Each of the nodes 110 is connected to its four closest neighbors. In this simplified example, only two dimensions are shown, the X and Y dimensions as indicated by the dimension key 330. In comparison, Bluegene has three dimensions of connections where each node would be connected to its six closest neighbors on each midplane. Each of the node boards 120a, 120b has a clock repeater circuit 310 that propagates clock signals on the node board 120. The clock repeater circuits 310 are connected to a clock source 320. The clock source 320 is located on the midplane 132 in board rack 130 (FIG. 1).

Figure 4:
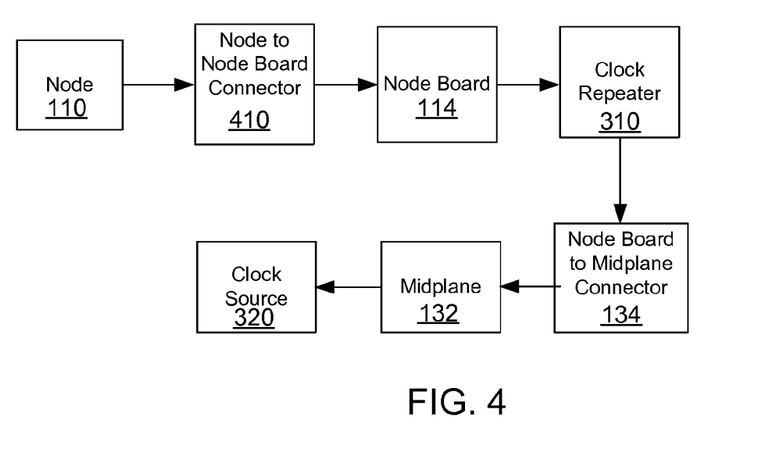
FIG. 4 is a block diagram that shows an interconnection topology for a clock source to a node in a massively parallel computer system according to preferred embodiments.

FIG. 4 represents the component topology for the clock input into a node 110 according to the simplified example introduced in FIG. 3. The component topology for an input into a node represents each of the components which are in the path between the node and the source of the input in a hierarchical topology. In the example of FIG. 4, the clock input topology begins with the node 110 which is connected by a node connector 410 to a node board 114. The node board 114 has a clock repeater circuit 310 as discussed above. The clock repeater circuit 310 has an input from a midplane connector 134 that connects the node board to the midplane 132. The midplane is a printed wiring board (PWB) that has a clock source 320. (For this simplified example, it is assumed the clock source on the midplane PWB is the final source of the clock.) When an error occurs at the clock link or input to a node 110, any component in the clock input topology could be the cause of the error. This topology will be used to determine which component is a possible cause of the system failure as described further below. The arrows in the topology indicate the direction the method below takes to traverse the topology starting from the compute node.

Figure 5:
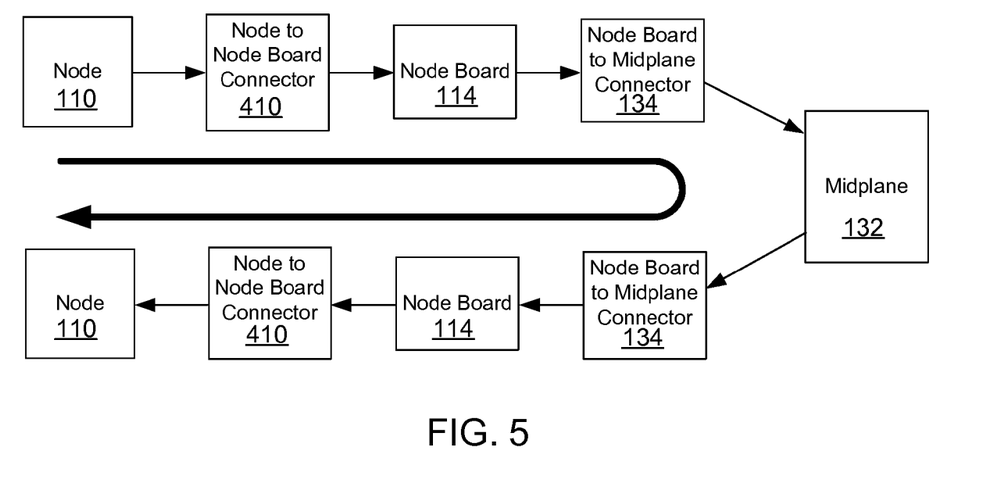
FIG. 5 is another block diagram that shows an interconnection topology for a node to node connection in a massively parallel computer system according to preferred embodiments.

FIG. 5 represents another component topology for a node input according to the simplified example introduced in FIG. 3. This component topology is a node-to-node topology for a network input into a node. The topology illustrates all the components which are in the path between the node and the next node in a hierarchical topology. In the example of FIG. 5, the network input topology begins with the node 110 which is connected by a node connector 410 to a node board 114. The node board 114 connects through a midplane connector 134 to the midplane 132. From the midplane 132 to the next node 110, the topology has the same components in the reverse order, i.e. midplane connector 134, node board 114, node connector 410, and node 110. When an error occurs on a network input to a node 110, any component in the node-to-node topology could be the cause of the error.

Figure 6:
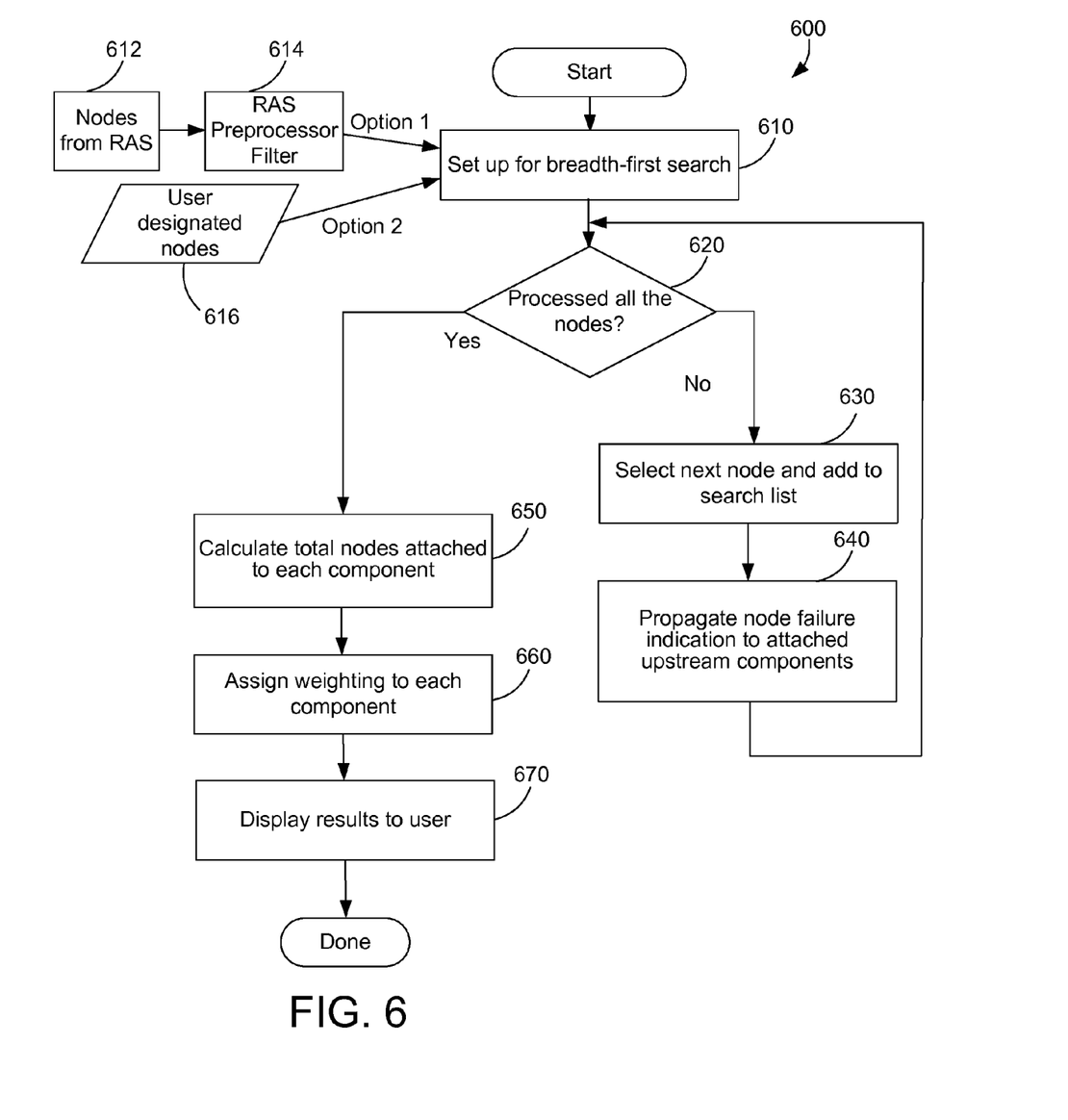
FIG. 6 is a method flow diagram for fault isolation in a massively parallel computer system according to a preferred embodiment.

FIG. 6 shows a method 600 for autonomic fault isolation in a highly interconnected computer system according to embodiments herein. The first step of the method is to set up for a breadth-first search of the system topology (step 610). The set up of the breadth-first search uses as inputs a set of designated nodes. The designated nodes in a first option are identified by the RAS 612. The raw RAS output is then pre-processed at 614 to determine nodes that indicate a failure. In the second option, the user is allowed to designate nodes 616 to input into the search where the user has used other means to determine failing nodes such as nodes that are reporting failure by application software. The setup of the breadth-first search prepares a node list of failing nodes (step 610). The next part of the method is to process all the identified nodes (step 620) in the node list prepared at setup. If all the nodes have not been processed (step 620=no) then the next node in the node list is added to the search list (step 630) and the node failure is propagated to each attached upstream component according to the system topologies (step 640, see FIG. 7). If the nodes have all been processed, (step 620=yes) then the total nodes attached to each component are calculated (step 650) and a weighting is assigned to each component (step 660) to indicated to likelihood the component is the cause of the fault and these results are displayed to the user (step 670). The method is then done. The details of steps 640 and 650 are described further in FIGS. 7 and 8 respectively.

Figure 7:
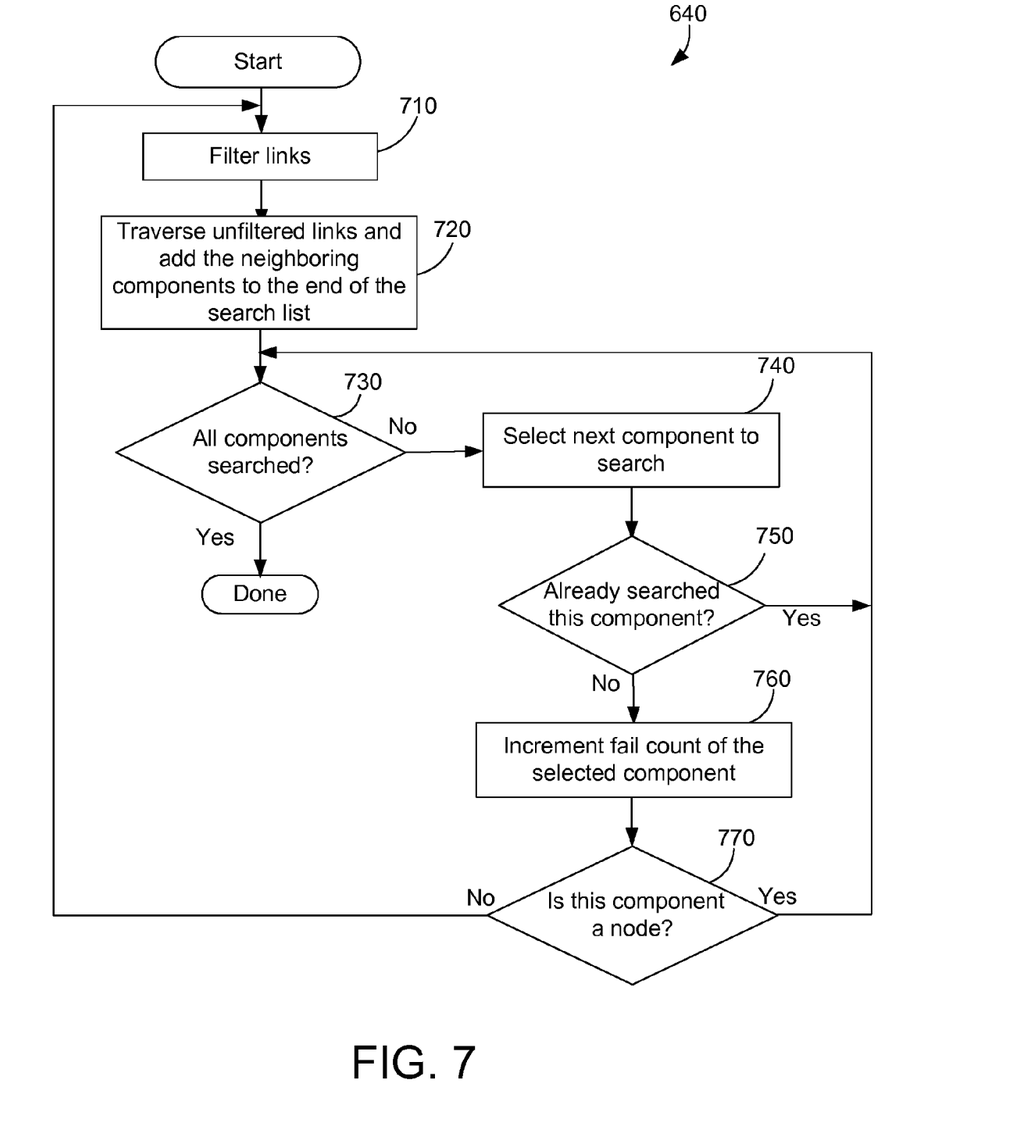
FIG. 7 is another method flow diagram for fault isolation in a massively parallel computer system according to a preferred embodiment.

FIG. 7 shows a method 640 for propagating a node failure indication to all components attached upstream in the system topology from a node according to embodiments herein. First, for the node currently being processed, filter unnecessary component links and add the remaining links to the search list (step 710). Unnecessary links are those links that do not need to be traversed because they do not contribute to the type of failure indicated. Next, traverse all unfiltered component links and add the neighboring components to the search list (step 720). Search all the components in the search list (step 730). If the components have not all been searched (step 730=no) then the next component in the search list is selected (step 740). If this component has already been searched (step 670=yes) then return to step 730. If this component has not already been searched (step 750=no), then increment the components fail count (step 760). If the component being searched is a node (step 770=yes) then return to step 730 to process the next component. If the component being searched is a not a node (step 770=no) then return to step 710 to process all the links to this component (beginning at step 710). When all the components have all been searched (step 730=yes) then the method is done.

Figure 8:
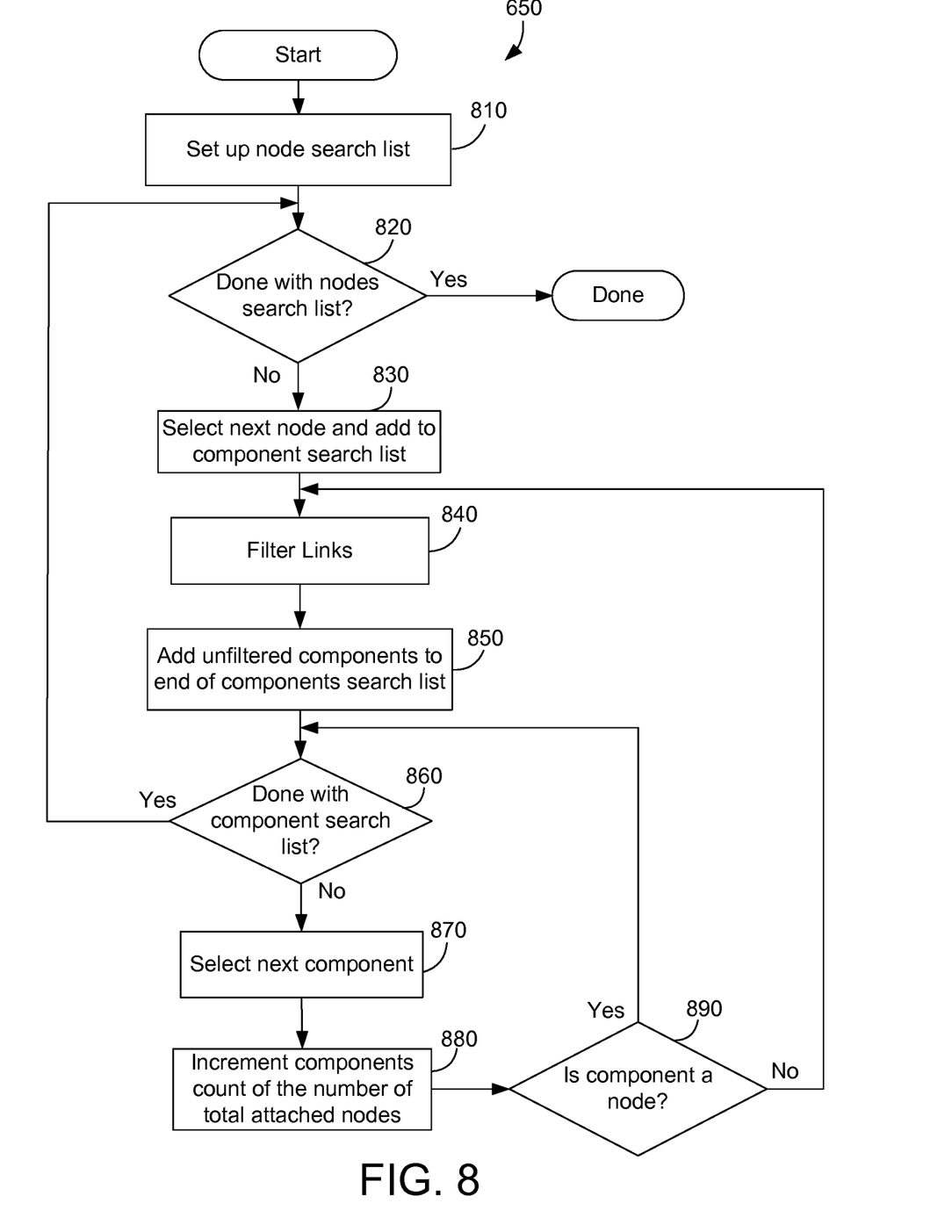
FIG. 8 is another method flow diagram for fault isolation in a massively parallel computer system according to a preferred embodiment.

FIG. 8 shows a method 650 for calculating the total failure reporting components attached to each component according to embodiments herein. The first step of method 650 is to set up a search list of each node (step 810). The search list is set up by using all nodes in virtual topology for the system. The method next processes the nodes through several steps until it is done with all the nodes in the search list (step 820 yes). If all the nodes in the search list are not done (step 820=no) then select the next node in the search list (step 830). Next, filter unnecessary component links (step 840) and add the unfiltered links to the search list (step 850). Search each components in the search list with remaining steps as follows. If not done with the components search list (step 860=no) then select the next component in the search list (step 870). Increment the components count of the total number of attached failing nodes (step 880). If this component is a node (step 890=yes) then return to step 860 to continue searching components attached to this node. If this component is not a node (step 890=no), then return to step 840 to process this component further to find additional components linked to this node. When all the components have all been searched (step 820=yes) then the method is done.

An example of the above methods will now be described to illustrate a preferred embodiment with reference to FIGS. 3 through 8. This example assumes the following failures specified via the RAS in option 1 shown in FIG. 6: Node3 (X+ failure), Node6 (Y− failure), Node9 (X− failure), Node10 (Y+ failure). Some repetitions through the method are removed for simplicity as indicated below. Also, the node board and connectors in the topology shown in FIGS. 4 and 5 are not included in this example. With these assumptions we now use method 600 in FIG. 6 as described in detail below:

Start
Step 610) Setup for breadth-first search
Step 620) Processed all identified nodes? Answer: no
Step 630) Select node (Node 3) and add it to the searchlist: Searchlist="3"
Step 640) Enter propagate node failure block . . . .

Step 710) Filter links. Node 3 has 5 links (X+, X−, Y+, Y−, and a clock input) Since the problem occurred in the X+ direction, the other directions are removed. This leaves us to traverse the X+ and clock input links.

Step 720) Traverse unfiltered links and add neighboring components to the end of the searchlist. Node 3 has a clock repeater connected to its clock input. So that is added to the searchlist. Node 3 has a midplane immediately attached to its X+ link. Searchlist="3", "Midplane", "Nodeboard0 clock repeater"

Step 730) Have all components been searched? Answer: no.

Step 740) Select next component to search: Node 3 Searchlist="Midplane", "Nodeboard0 clock repeater"

Step 750) Have we already searched this component? Answer:no

Step 760) Increment fail count. Node 3's fail count goes to 1.

Step 760) Is this component a node? Answer: yes.

Step 730) Have all components been searched? Answer: no.

Step 740) Select next component: Midplane
Searchlist="Nodeboard0 clock repeater"

Step 750) Have we searched this component? Answer: no

Step 760) Increment fail count. Midplane's fail count goes to 1.

Step 770) Is the midplane a node? Answer: no

Step 720) Filter links. Midplane has 8 links. (3 X+ links and 3 X− links+2 clock input links). Since we entered the midplane from 1 specific X− link (from the midplane's perspective), there is only 1 valid destination. This leaves us to traverse the corresponding X+ link. The Midplane has node 8 attached to the X+ link. So node 8 is added to the searchlist. Searchlist="Nodeboard 0 clock repeater", "Node 8"

Steps 730 to 770 are repeated for "Nodeboard0 clock repeater".

Clock source is added to the search list. The fail count for "Nodeboard 0 clock repeater", Clock source and "Node 8" are all incremented to 1.

After searching processing clock source through steps 730 to 770 . . . .

Step 710) Filter links. The clock source has no outputs.

Step 720) There are no links to add.
Searchlist is empty

Step 730) Have we searched all components? Answer: yes (This completes the processing of node 3. The flow returns to step 620.)

Step 620) Processed all nodes? Answer: no

Step 630) Select node (Node 3) and add it to the searchlist:
Searchlist="Node 3"

Step 640) Enter propagate node failure block . . . . (The above steps described for node 3 are repeated for node 6, then again for node 9 and node 10. When this is complete for node 10, flow would return to step 620)

Step 620) Have we processed all nodes? Answer: yes

Step 650) Calculate total nodes attached to each component.

Step 810) Setup Nodesearchlist
Nodesearchlist="Node0", "Node1", "Node2", "Node3", "Node4", "Node5", "Node6", "Node7", "Node8", "Node9", "Node10", "Node11"

Step 820) Done with nodes search list? Answer: no

Step 830) Select next node: Node0
Nodesearchlist="Node1", "Node2", Node3", "Node4", "Node5", "Node6", "Node7", "Node8", "Node9", "Node10", "Node11"
CompSearchlist=Node0

Step 840) Filter links. Select torus and clock links (In this simplified example, these are the possible links in the topology) (3 links. Node1 and Node2)

Step 850) Add unfiltered components to end of component search list.
CompSearchlist=Node0, Node2, Node1, "Nodeboard0 ClockRepeater"

Step 860) Are we done with component search list? Answer: no

Step 870) Select next component (Node0) from compsearchlist.
CompSearchlist=Node2, Node1, "Nodeboard0 ClockRepeater"

Step 880)—Increment totalcount for Node0. Node0 count is now 1.

Step 890)—Is component a node, answer: yes.

Step 860)—Are we done with searchlist? Answer: no.

Step 870)—Select Node2 from compsearchlist
CompSearchlist=Node1, "Nodeboard0 ClockRepeater"

Step 880)—Increment totalcount for Node2. Node2 count is now 1.

Step 890) Is component a node? Answer: yes.

Step 860)—Are we done with searchlist? Answer: no.

Step 870)—Select Node1 from compsearchlist
CompSearchlist="Nodeboard0 ClockRepeater"

Step 880)—Increment totalcount for Node1. Node1 count is now 1.

Step 890)—Is component a node? Answer: yes.

Step 860)—Are we done with searchlist? Answer: no.

Step 870)—Select "Nodeboard0 ClockRepeater"
CompSearchlist is empty

Step 880)—Increment totalcount for "Nodeboard0 ClockRepeater". "Nodeboard0
ClockRepeater" count is now 1.

Step 890)—Is component a node? Answer: no

Step 840)—Filter links. Only valid output in the clockinput

Step 850)—Add components:
CompSearchList="Clocksource"

Step 860)—Are we done with searchlist? Answer: no

Step 870)—Select "Clock source"

Step 880)—Increment totalcount for "Clock source". "Clock source" count is now 1.

Step 890)—Is component a node? Answer: no

Step 840)—Filter links. no output links from clock source

Step 850)—Nothing to add

Step 850) Are with done w/ component searchlist? Answer: yes.

Step 820) Are we done with node searchlist. answer=no.

Step 850) 33) Select next node: Node1
Nodesearchlist="Node2", Node3", "Node4", "Node5", "Node6", "Node7", "Node8", "Node9", "Node10", "Node11"
CompSearchlist=Node1

Step 840) Filter links. Select torus and clock links (4 links. X−, X+, Y− and clockinput)

Step 850) Add links.
CompSearchlist=Node1, Node0, Node3, Midplane, "Nodeboard0 ClockRepeater"

Step 860) Are we done with searchlist? Answer: no
Step 870) Select Node1 from compsearchlist
  CompSearchlist=Node0, Node3, Midplane, "Nodeboard0 ClockRepeater"
Step 880) Increment totalcount for Node1. Node1 count is now 2.
Step 890) Is component a node? Answer: yes.
Step 860)—Are we done with searchlist? Answer: no.
Step 870)—Select Node0 from compsearchlist
  CompSearchlist=Node3, Midplane, "Nodeboard0 ClockRepeater"
Step 880)—Increment totalcount for Node0. Node0 count is now 2.
Step 890)—Is component a node? Answer: yes.
Step 860)—Are we done with searchlist? Answer: no.
Step 870)—Select Node3 from compsearchlist
  CompSearchlist=Midplane, "Nodeboard0 ClockRepeater"
Step 880)—Increment totalcount for Node3. Node3 count is now 1.
Step 890)—Is component a node? Answer: yes.
Step 860)—Are we done with searchlist? Answer: no
Step 870)—Select "Midplane"
  CompSearchList="Nodeboard0 Clockrepeater"
Step 880)—Increment totalcount for Midplane. Midplane count is now 1
Step 890)—Is component a node? Answer: no
Step 840)—Filter links. 1 valid link in the X+ direction
Step 850)—Add link to compsearchlist
  CompSearchList="Nodeboard0 Clockrepeater", "Node6"
Step 860) Are we done with searchlist? Answer: no
Step 870) Select new component. Select "Nodeboard0 Clockrepeater"
  CompSearchList="Node6"
Step 880) Increment totalcount for "Nodeboard0 Clockrepeater".
  Count is now 2.
Step 890) Is component a node? Answer: no
Step 840) Filter links. 1 valid link to the clock input.
Step 850) Add clockinput link to compsearchlist
  CompSearchList="Node6", "Clock Source"
Step 860) Are we done with searchlist? Answer: no
Step 870) Select "Node6"
Step 880) Increment totalcount for "Node6". Node6 count is now 1.
Step 890)—Is component a node? Answer: yes
Step 860)—Are we done with searchlist? Answer: no
Step 870)—Select "Clock Source"
Step 880)—Increment totalcount for "Clock Source". Clocksource count is now 2.
Step 890)—Is component a node? Answer: no
Step 840)—Filter links. No output links.
Step 850)—Nothing to add.
Step 850)—Are we done with searchlist? Answer: yes.
(Repeat steps 820 through 890 for the other nodes in nodesearchlist)
Step 820) Are we done with node searchlist? Answer: yes
Step 660) Calculate weights, where the weight in this example is the propagated failure indications divided by the total count of components (See table 1).

Step 670) Display weighted results. In this example, all non-zero weights are displayed to the user in descending order (See table 2).
Done—The example is complete.

TABLE 1

| Component | Propagated Failure Indications | Total Count | Weight |
| --- | --- | --- | --- |
| Node0 | 0 | 2 | 0 |
| Node1 | 0 | 3 | 0 |
| Node2 | 0 | 3 | 0 |
| Node3 | 1 | 4 | .25 |
| Node4 | 0 | 2 | 0 |
| Node5 | 0 | 3 | 0 |
| Node6 | 1 | 3 | .33 |
| Node7 | 0 | 2 | 0 |
| Node8 | 4 | 4 | 1.0 |
| Node9 | 1 | 3 | .33 |
| Node10 | 1 | 3 | .33 |
| Node11 | 0 | 2 | 0 |
| Nodeboard0_ClkR | 1 | 6 | .167 |
| Nodeboard1_ClkR | 3 | 6 | .5 |
| Midplane | 1 | 3 | .33 |
| Clocksource | 4 | 12 | .33 |

TABLE 2

| Component | Propagated Failure Indications | Total Count | Weight |
| --- | --- | --- | --- |
| Node8 | 4 | 4 | 1.0 |
| Nodeboard1_ClkR | 3 | 6 | .5 |
| Node6 | 1 | 3 | .33 |
| Node9 | 1 | 3 | .33 |
| Node10 | 1 | 3 | .33 |
| Midplane | 1 | 3 | .33 |
| Clocksource | 4 | 12 | .33 |
| Node3 | 1 | 4 | .25 |
| Nodeboard0_ClkR | 1 | 6 | .167 |

The example above illustrates a preferred embodiment for autonomic fault isolation in a highly interconnected computer system. In the illustrated example, a set of identified failures was reported (Node3 (X+ failure), Node6 (Y− failure), Node9 (X− failure), Node10 (Y+ failure)). After processing failure indications into the virtual topology according to the identified failures and calculating the weighting, the data in Table 2 indicates that node 8 is most likely the source of the fault since node 8 has the highest weight. Thus node 8 is most likely causing a fault that is the source of the identified failures. The fault isolation information as illustrated in Table 2 can be used to assist in troubleshooting and repair of the system in a timely manner by giving repair personnel a prioritized list of potential sources of the fault.

As described above, embodiments provide a method and apparatus for autonomic fault isolation in highly interconnected computer system such as a massively parallel super computer system. Embodiments herein can significantly decrease the amount of down time for increased efficiency of the computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A highly interconnected computer system comprising:
a plurality of interconnected compute nodes; and
a service node that receives failure indications of system components that have a failure, including from the compute nodes in the highly interconnected system comprising:
   a virtual topology of the highly interconnected computer system;
   a failure indication count for each system component in the virtual topology; and
   a fault isolator to autonomically isolate faults in the system by traversing the virtual topology and propagating failure indications from the system components, wherein the fault isolator propagates each failure indication by incrementing the failure indication count of each component in the virtual topology connected to the system component with the failure.

2. The highly interconnected computer system of claim 1 wherein the fault isolator determines a weighting of the likelihood of a component causing the fault by comparing a total number of failure indications propagated to each component with a total count of the components that are capable of reporting a failure connected to each component.

3. The highly interconnected computer system of claim 2 wherein the weighting further includes the hopcount of the component.

4. The highly interconnected computer system of claim 2 wherein the weighting is displayed to the user.

5. The highly interconnected computer system of claim 1 wherein the highly interconnected computer system is a massively parallel computer system.

6. The highly interconnected computer system of claim 1 wherein the fault isolator traverses each component in the virtual topology until another node is encountered.

7. A computer implemented method for fault isolation on a highly interconnected computer system comprising the steps of:
   a) preparing a list of system components of the highly interconnected computer system with a failure;
   b) traversing a virtual topology of the highly interconnected computer system to propagate a failure indication for each system component on the list, wherein the failure indication is propagated by incrementing a failure indication count of each component in the virtual topology connected to the system component with the failure; and
   c) weighting each component in the virtual topology based on the likelihood that component is the cause of a fault.

8. The computer implemented method of claim 7 wherein the step of traversing the virtual topology further comprises the steps of:
   1) filtering links that are not in failure;
   2) traversing the unfiltered links and adding neighboring components to the end of a component search list;
   3) selecting the next component in the component search list to search until all the components in the component search list have been searched;
   4) incrementing a fail count of each component connected to the selected component that has not been searched; and
   5) if the selected component is not a node, then returning to step 1 to traverse links of the selected component to further search the link.

9. The computer implemented method of claim 7 wherein the step of weighting compares a total number of failure indications for the component with a total count of the components that are capable of reporting a failure connected to the component.

10. The computer implemented method of claim 9 wherein the weighting further includes the hopcount of the component.

11. The computer implemented method of claim 9 wherein the weighting is displayed to the user.

12. The computer implemented method of claim 7 wherein the highly interconnected computer system is a massively parallel computer system.

13. The computer implemented method of claim 7 wherein the fault isolator traverses the virtual topology until another node is encountered.

14. A computer-readable program product comprising:
   a fault isolator that autonomically isolates faults in a highly interconnect computer system by traversing a virtual topology and propagating failure indications from components of the highly interconnected computer system that have a failure, wherein each failure indication is propagated by incrementing a failure indication count of each component in the virtual topology connected to the system component with the failure; and
   recordable media bearing the inbound packet filter mechanism.

15. The program product of claim 14 wherein the fault isolator determines a weighting of the likelihood of a component causing the fault by comparing a total number of failure indications for the component with a total count of the components that are capable of reporting a failure connected to the component.

16. The program product of claim 15 wherein the weighting further includes the hopcount of the component.

17. The program product of claim 15 wherein the weighting is displayed to the user.

18. The program product of claim 14 wherein the highly interconnected computer system is a massively parallel computer system.

19. The program product of claim 14 wherein the fault isolator traverses the virtual topology until another node is encountered.

* * * * *